Feb. 26, 1963    F. M. RYCK ETAL    3,078,493
WINDSHIELD CLEANING SYSTEM
Filed July 24, 1961    2 Sheets-Sheet 1

INVENTORS
Francis M. Ryck
BY Eugene R. Ziegler
Their Attorney

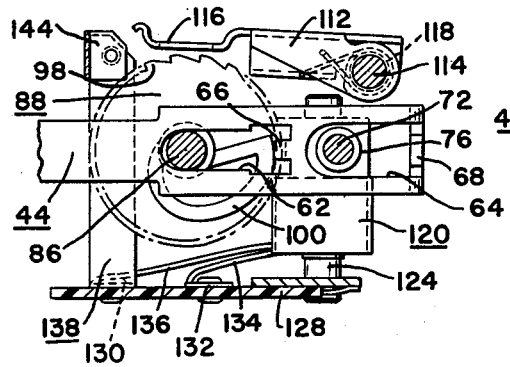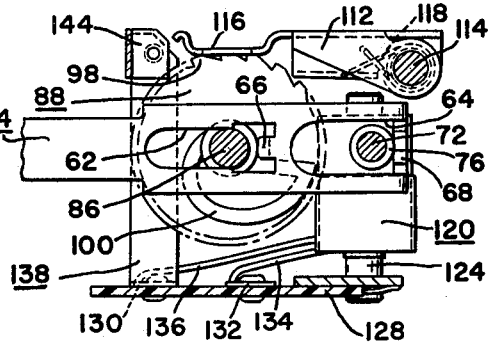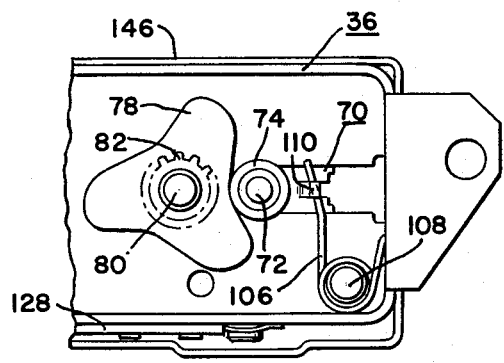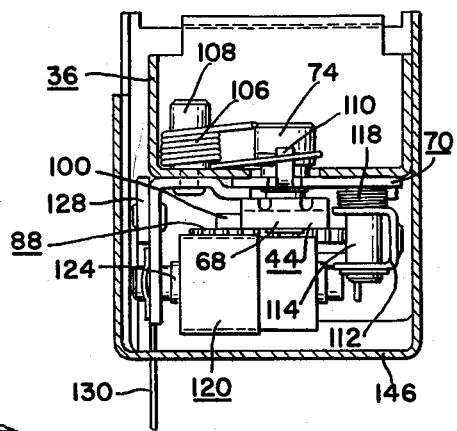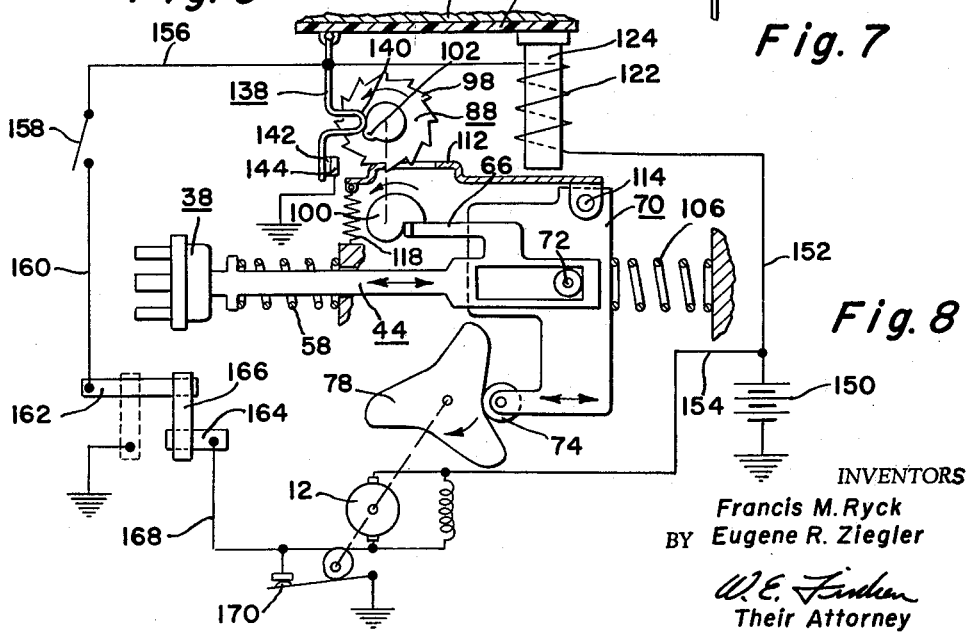

United States Patent Office 3,078,493
Patented Feb. 26, 1963

3,078,493
WINDSHIELD CLEANING SYSTEM
Frank M. Ryck, Rochester, and Eugene R. Ziegler, Spencerport, N.Y., assignors to General Motors Corporation, Detroit, Mich., a corporation of Delaware
Filed July 24, 1961, Ser. No. 126,051
13 Claims. (Cl. 15—250.02)

This invention pertains to windshield cleaning systems, and particularly to a washer unit for discharging liquid solvent onto a windshield in timed relation to movement of the wipers thereacross.

Heretofore, washer units of the general type disclosed in Ziegler Patent 2,878,505 have been manufactured wherein the washer unit comprises a pump having an interruptible driving connection with a wiper motor so as to apply intermittent squirts of liquid solvent onto the windshield during operation. This invention relates to an improved washer unit of the aforesaid type wherein the driving connection between the wiper motor and the timing element is electrically controlled throughout the entire cycle of operation. Accordingly, among our objects are the provision of a windshield cleaning system including an improved intermittent squirt type washer pump; the further provision of a wiper motor driven washer pump including ratchet wheel timing means and electromagnetic means for establishing a driving connection between the motor and the timing means during washer operation; and the still further provision of a wiper motor driven washer pump including cam actuated reciprocable means for operating the pump and actuating the timing means.

The aforementioned and other objects are accomplished in the present invention by pivotally mounting the driving means for the timing element on a reciprocable slider and utilizing an electromagnet to establish a driving connection between the timing means and the driving means. Specifically, the washer unit includes a pump of the bellows type having a spring effected delivery stroke and a wiper motor effected intake stroke. The pump includes a rod or plunger having a lost motion connection with the reciprocable slider and a lug engageable with a lockout cam formed on a ratchet cam assembly constituting the timing means. The reciprocable slider carries a cam follower engageable with a wiper motor driven cam such that during operation of the wiper motor the slider is continuously reciprocated irrespective of whether or not the driving connection between the slider and the pump rod is established or interrupted. A drive pawl for the ratchet cam assembly is pivotally mounted on the reciprocable slider and normally spring biased out of engagement with the ratchet wheel. The drive pawl constitutes the armature of an electromagnet such that when the electromagnet is energized the drive pawl is moved into engagement with the ratchet wheel.

Energization of the electromagnet is controlled by a manually operable switch, which may be of the push button type, and a cam actuated switch operated by the timing means for closing a holding circuit after a one step movement of the ratchet wheel. Accordingly, the push button manual switch need only be momentarily closed and thereafter released to initiate a conjoint cycle of washer-wiper operation. Preferably, the push button switch is mechanically connected with the wiper switch through a one-way driving connection as shown in Ziegler Patent 2,905,962 so that the wiper motor is simultaneously energized with the washer electromagnet when the push button is depressed. After a one tooth movement of the ratchet wheel timing element, the lug on the pump rod is disengaged from the lockout cam and the prestressed spring immediately effects a delivery stroke of the pump and drivingly connects the pump rod and the reciprocable slider so that the motor can effect the intake stroke of the pump. The pump operates for a predetermined number of wiper strokes as determined by the arcuate extent of the lockout cam on the ratchet cam assembly after which the driving connection between the reciprocable slider and the pump rod is automatically interrupted to arrest pump operation. The ratchet cam timing element continues to have step by step movement imparted thereto until it has been rotated through a complete revolution whereat the switch for the holding circuit of the electromagnet is opened to deenergize the electromagnet and interrupt the driving connection between the ratchet cam assembly and the reciprocable slider.

Further objects and advantages of the present invention will be apparent from the following description, reference being had to the accompanying drawings, wherein a preferred form of the present invention is clearly shown, and wherein like numerals depict like parts throughout the several views.

In the drawings:

FIGURE 4 is a fragmentary view, partly in section and partly in elevation, taken along line 4—4 of FIGURE 2 with the drive pawl disengaged from the ratchet wheel.

FIGURE 5 is a view similar to FIGURE 4 with the drive pawl engaged with the ratchet wheel.

FIGURE 6 is a fragmentary view in elevation taken in the direction of arrow 6 in FIGURE 2.

FIGURE 7 is a view, partly in section and partly in elevation, taken along line 7—7 of FIGURE 2.

FIGURE 8 is a composite electrical and mechanical schematic of the washer unit and the control system therefor.

Figure 1:
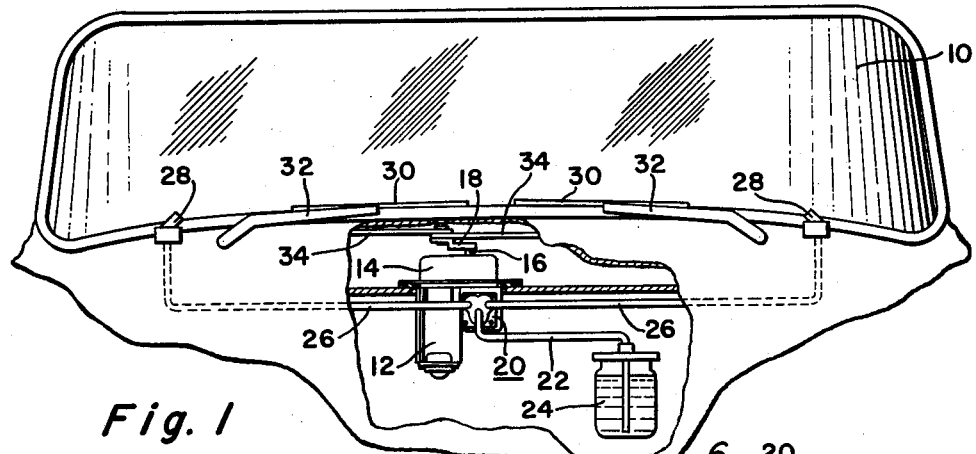
FIGURE 1 is a fragmentary view, partly in section and partly in elevation, of a vehicle equipped with the windshield washer pump of this invention.

With particular reference to FIGURE 1, the improved washer unit is designed to be used as a component in a cleaning system for a vehicle windshield 10, the cleaning system comprising an electric wiper motor 12 connected through a suitable gear reduction unit 14 to a unidirectional rotary output shaft 16 carrying a crank 18. A power take-off from the gear reduction unit 14, to be described, is used to operate a windshield washer pump 20 having an intake conduit 22 connected to a solvent reservoir 24 and a pair of delivery conduits 26 connected to spaced nozzles 28 for discharging liquid solvent onto predesignated areas of the windshield 10 in the paths traversed by wiper blades 30. The wiper blades 30 are carried by oscillatable wiper arms 32 which are connected to the rotary crank 18 through a conventional drive mechanism including links 34. In the illustrated embodiment, the wiper blades 30 are designed for simultaneous movement in opposite direction, or oscillation in phase opposition, but this is only exemplary since the cleaning system could obviously be of the type wherein the wiper blades move in tandem. In addition, the use of an electric wiper motor 12 is only exemplary, since the washer pump can obviously be driven from any rotary output shaft or even an oscillatory shaft as will be apparent. The term wiper unit as used herein designates the wiper motor, the linkage means, the arms, and the wiper blades; and the term washer unit designates the solvent reservoir, the washer pump, the conduits and the nozzles.

Figure 2:
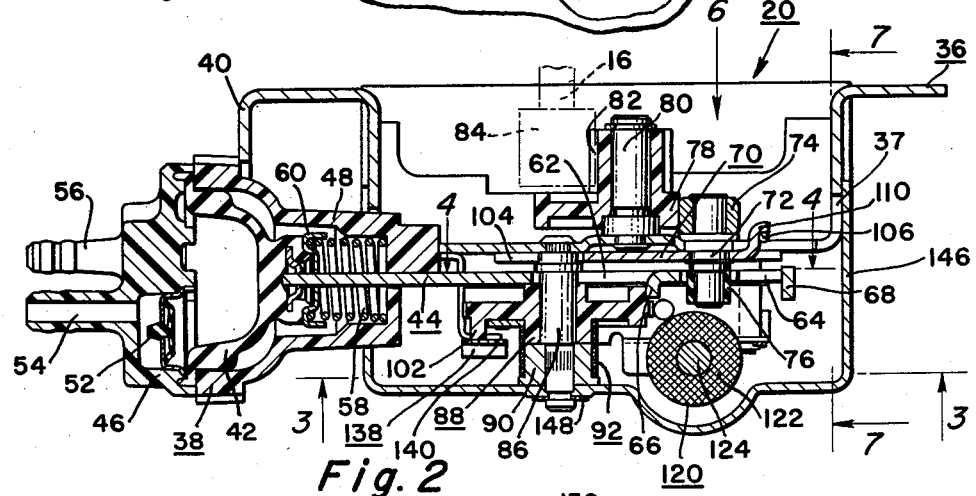
FIGURE 2 is a longitudinal sectional view of the improved pump assembly taken along line 2—2 of FIGURE 3.
Figure 3:
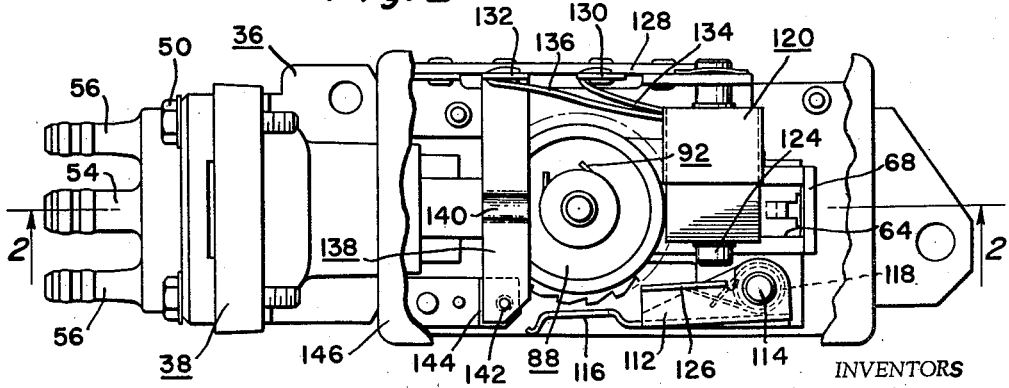
FIGURE 3 is a plan view with the cover broken away, taken along lines 3—3 of FIGURE 2.

Referring to FIGURES 2 and 3, the washer pump 20 comprises a frame 36 which is removably secured by means of screws, not shown, to the housing of the gear reduction unit 14. A pump housing 38 is secured to a flange 40 of the frame 36 by screws, not shown, the pump housing containing an elastomeric bellows, or bulb, 42 which is suitably secured to a reciprocable pump rod 44 which extends outside of the pump housing 38. The pump housing 38 which, as shown, is composed of plastic, includes a valve chamber part 46 and a spring chamber part 48 which are interconnected by screws 50. The valve chamber part 46 contains a single inlet check valve 52 as seen in FIGURE 2 connecting with an inlet nipple 54, and a pair of outlet check valves, not shown, which connect with a pair of outlet nipples 56. A coil spring 58 is disposed within the housing part 48, one end engaging the housing part 48 and the other end engaging a retainer 60 seated against the closed end of the bulb 42. The spring 58 is designed to collapse the bulb 42 and deliver liquid solvent through the outlet check valve to the nipple through the conduit 26 to the reservoir 28. The intake stroke of the pump is effected by movement of the rod 44 to expand the bulb whereupon liquid solvent will be drawn from the reservoir 24 through conduit 22 and the inlet check valve 52, this movement of the rod 44 also storing energy in the spring 58 for effecting another delivery stroke.

The pump rod 44 is formed with a pair of spaced elongate slots 62 and 64, a downturned lug 66 being arranged between the slots. A flange 68 is formed on the end of the rod 44 and closes the slot 64. A reciprocable slider 70 is disposed between the pump rod and the frame 36, the slider having a pin 72 attached thereto and extending from both sides thereof through slot 37 in the frame 36. The pin 72 has a roller 74 mounted on the upper side thereof as seen in FIGURE 2 and a rubber sleeve 76 mounted on the lower side thereof. The roller 74 constitutes a follower which engages a three lobe cam 78 journalled on a stud 80 attached to the frame 36. The cam 78, which as shown is composed of plastic, has an integral spur gear 82 adapted to mesh with a spur gear 84, shown in phantom, constituting the power take-off from the gear reduction unit 14 of the wiper motor 12. The gear 84 is attached to the shaft 16 and thus is driven in unison with the crank 18.

A second stud 86 is attached to the frame 36 and extends downwardly, as shown in FIGURE 2, and rotatably supports a ratchet cam assembly 88 constituting a stroke counting means. The lower end of the stud 86 of reduced diameter is knurled, and receives a cap 90. The cap 90 is thus restrained against rotation, and is encircled by a coil spring clutch 92. The coil spring clutch also encircles a portion of the hub of the ratchet cam assembly, and the axially spaced ends of the spring clutch extend outwardly from the coil body thereof. The coil spring 92 is used to preclude reverse rotation of the ratchet cam assembly as will be pointed out more particularly hereinafter. As seen particularly in FIGURES 4 and 5, the ratchet cam assembly 88 has a ratchet wheel portion 98 with twenty-one teeth, an arcuate lockout cam 100 and a face lug 102 (FIGURE 2) constituting a switch actuating cam.

The sleeve covered portion of the pin 72 is disposed within the slot 64 of the pump rod 44 and is engageable with the flange 68 for moving the pump rod 44 to the right. The stud 86 extends through the elongate slot 62 in the pump rod as well as through a slot 104 in the slider 70 so as to facilitate reciprocation of these parts relative to the stud 86. The coil spring clutch 92 prevents rotation of the ratchet cam assembly 88 in the clockwise direction as viewed in FIGURE 3 while permitting rotation of the ratchet cam assembly 88 in the counterclockwise direction. Thus, as seen in FIGURE 3, the coil spring clutch 92 will be wound into tight engagement with the stationary cam 90 upon any attempt of the ratchet cam 88 to rotate in the clockwise direction. However, during counterclockwise rotation of the ratchet cam 88 the coil spring clutch 92 will be unwound from the cap 90.

The slider 70, as seen particularly in FIGURES 6 and 7, has its follower roller 74 maintained in engagement with the three lobe cam 78 by means of a torsion spring 106. The torsion spring encircles a stud 108 attached to the frame 36, and has one end in engagement with the frame and its other end interlocked with a lug 110 on the slider 70. A drive pawl 112 is pivotally mounted on a stud 114 attached to the slider 70. The drive pawl has a window, or slot, 116 for receiving the teeth on the ratchet wheel portion 98 of the ratchet cam assembly 88 for imparting step by step movement to the ratchet cam assembly. The stud 114 is encircled by a torsion spring 118, one end of which extends through a hole, not shown, in the slider and the other end of which engages the pawl 112 so as to normally maintain the pawl disengaged from the ratchet teeth. An electromagnet 120 including a coil 122 and a core 124 is attached to the frame 36, the drive pawl 112 including a flange portion 126 constituting an armature for the electromagnet 120 (FIGURE 3).

A terminal board 128 of insulating material is attached to the frame and supports a pair of terminal strips 130 and 132 which are connected by wires 134 and 136, respectively with the coil 122 of the electromagnet. The terminal strip 132 is also connected to a leaf spring switch blade 138 which extends transversely across the frame 36 and has a follower portion 140 engageable with the lug 102 on the ratchet cam assembly. The switch blade 138 is inherently biased towards the frame 36 and carries a contact 142 adjacent its free end engageable with a stationary contact 144 electrically and mechanically connected to the frame 36. The frame 36, which may be composed of steel, is electrically grounded.

The frame 36 is adapted to telescopically receive a plastic cover 146 which is retained in assembled relation with the frame 36 by a retaining ring 148 attached to the end of the stud 86, the stud 86 projecting through an opening in the cover 146. The terminal strips 130 and 132 extend through an elongated slot in the cover, not shown, and have lead wires suitably connected thereto.

Referring particularly to FIGURES 4 and 5, when the electromagnet 120 is deenergized, the torsion spring 118 moves the pawl 112 out of engagement with the ratchet wheel 98, the drive pawl 112 at this time engaging the side wall of the cover 146. The electromagnet 120 is only deenergized when the driving connection between the pin 72 of the slider 70 and the pump rod 44 is interrupted by engagement of the pump rod lug 66 with the lockout cam 100, as seen in FIGURE 4. At this time the bellows or bulb 42 is fully charged, or full of liquid solvent, which will immediately be discharged onto the windshield 10 by collapse of the bulb 42 under the urge of the spring 58 when the lug 66 is disengaged from the lockout cam 100. The lockout cam 100, as seen in FIGURES 4 and 5, subtends an angle of substantially 120°.

When the electromagnet 120 is energized, the drive pawl 112 is immediately moved into driving engagement with the ratchet wheel 98, as seen in FIGURE 5. Moreover, as will be pointed out hereinafter, the wiper motor 12 is simultaneously energized so that the shaft 16 is driven thereby imparting rotation to the cam 78. As the follower 74 is urged to the right, as viewed in FIGURE 6, by the cam 78 the pawl 112 imparts a one toothed movement to the ratchet cam assembly 88 thereby disengaging the lug 66 from the lockout cam 100 and enabling the spring 58 to collapse the bulb and discharge liquid solvent onto the windshield. During continued rotation of the cam 78 the slider 70 will be reciprocated such that as the follower 74 is moved to the right, the pump rod 44 will likewise be moved to the right by engagement between pin 72 and the lug 68 on the pump rod. Thus, as the follower 74 is moved to the right by the cam 70 the intake stroke of the pump is effected and when the follower 74 and the slider 70 move to the left and into the dwell of the cam, the pump rod 44 is freed for actuation by the spring 58 to effect the delivery stroke. During each complete cycle of pump operation the ratchet cam 88 is moved through a distance of one tooth such that after a 240° angular movement of the ratchet cam the lug 66 of the pump rod will reengage the lockout cam and thus interrupt the driving connection between the slider 70 and the pump rod 44. The leaf spring blade 138 is disengaged from the cam lug 102 after one tooth movement of the ratchet cam assembly 88 from the "off" position and thus completes a holding circuit for maintaining the electromagnet energized until the ratchet cam has rotated throughout a complete revolution. When the ratchet cam assembly 88 returns to its initial position the lug 102 deflects the leaf spring blade 138 thereby separating contacts 142 and 144 and thus deenergizing the electromagnet 120.

With reference to FIGURE 8, the windshield cleaning system is electrically operated and is energized from a battery 150 having one terminal grounded and its other terminal connected to wires 152 and 154. Wire 152 connects with one end of the electromagnet coil 122, the other end of which is connected to wire 156. The leaf spring blade 138 is shown electrically connected to the wire 156 with its contact 142 in engagement with the stationary contact 144. The wire 156 connects with a manual push button switch 158 which is connected by wire 160 to a stationary contact 162 of a manual wiper control switch. The manual wiper control switch includes a second stationary contact 164 and a movable bridging contact 166. The stationary contact 164 is connected by wire 168 to one terminal of the wiper motor 12, the other terminal of which is connected to wire 154. A cam actuated parking switch 170 is connected with the wire 168 in shunt relation to the manual wiper switch.

In FIGURE 8 the wiper motor 12 is energized since the bridging contact 166 interconnects contacts 162 and 164. Moreover, the coil 122 of the electromagnet is energized through contacts 142 and 144. As the cam 78 rotates, reciprocation is imparted to the slider 70 so as to impart intermittent step movement to the ratchet cam assembly 88 through the drive pawl 112. Moreover, at this time the pump is intermittently operated through pump rod 44 and spring 58. As the ratchet cam assembly 88 including the ratchet cam 98 and the lockout cam 100 are rotated in the counterclockwise direction as seen in FIGURE 8, the pump will be arrested when the pump rod lug 66 reengages the rise on the lockout cam 100, and when the ratchet cam assembly 88 completes a revolution the lug 102 will engage the follower portion 140 on the spring switch blade 138 to separate contacts 142 and 144 and deenergize the electromagnet 120. The wiper motor 12 will continue to operate until the manual switch 166 is moved to the "off" position wherein it does not bridge stationary contacts 162 and 164. In the disclosed embodiment the washer pump will be intermittently operated throughout fourteen wiper strokes, while it will require twenty-one wiper strokes to effect a complete revolution of the ratchet cam assembly.

To initiate a cycle of conjoint washer-wiper operation, it is only necessary to momentarily close the washer switch 158 for a sufficient length of time to enable the cam 78 to reciprocate the slider and impart a one step movement to the ratchet cam assembly 88. Thereafter, the contacts 142 and 144 will complete a holding circuit around the washer switch 158. It is understood that the wiper is energized simultaneously upon closure of the washer switch 158 by a one-way driving connection between the switch 158 and the bridging contact 166 such as shown in the aforementioned Ziegler Patent 2,905,962.

From the foregoing it is apparent that the present invention is directed to an improved intermittent squirt type washer pump which is driven by the wiper motor wherein the drive pawl for the timing element is maintained in driving engagement therewith by an electromagnet and wherein the energizing circuit for the electromagnet is automatically controlled by a cam actuated switch. This construction greatly simplifies the control mechanism for the pump and reduces the over-all size of the pump assembly.

While the embodiment of the invention as herein disclosed constitutes a preferred form, it is to be understood that other forms might be adopted.

What is claimed is as follows:

1. A windshield cleaning system comprising, a wiper unit including a motor, a washer unit including a pump having an interruptible driving connection with the motor of said wiper unit, a wiper unit stroke counting timing element for controlling the driving connection between said pump and said motor, an interruptible driving connection between said motor and said timing element, an electromagnet for establishing and maintaining the driving connection between said timing element and said motor for a predetermined number of wiper unit strokes, a manual control for simultaneously activating said wiper unit and energizing said electromagnet, and switch means actuated by said timing element for controlling energization of said electromagnet to interrupt the driving connection between said motor and said timing element after said predetermined number of wiper unit strokes.

2. A windshield cleaning system including, a wiper unit, a washer unit, said washer unit including a pump having an interruptible driving connection with said wiper unit, a manual control for initiating conjoint operation of said wiper unit and said washer unit including a switch, a wiper unit stroke counting timing element driven by said wiper unit during conjoint operation for controlling the driving connection between said wiper unit and said washer unit and for automatically arresting operation of said washer unit after a first predetermined number of wiper unit strokes, said timing element having an interruptible driving connection with said wiper unit, an electromagnet which, when energized, establishes and maintains the driving connection between said timing element and said wiper unit, a first switch controlling the initial energization of said electromagnet, and a second switch actuated by said timing element for thereafter controlling energization of said electromagnet to automatically interrupt the driving connection between said timing element and said wiper unit after a second predetermined number of wiper unit strokes.

3. A washer pump assembly for a vehicle windshield including, a wiper motor driven rotatable cam, a pump having a spring actuated delivery stroke, a reciprocable pump rod for effecting the intake stroke of said pump, a reciprocable slider having a follower engaging said cam so as to be continuously reciprocated during rotation thereof, an interruptible driving connection between said slider and said pump rod, a timing element having an interruptible driving connection with said slider and controlling the driving connection between said pump rod and said slider, the driving connection between said timing element and said slider including a pivotally mounted spring biased pawl, an electromagnet coacting with said pawl to establish and maintain the driving connection between said slider and said timing element when energized, and an energizing circuit for said electromagnet including switch means actuated by said timing element for automatically deenergizing said electromagnet after a predetermined movement of said timing element.

4. A washer pump assembly for a vehicle windshield including, a frame having a rotatable cam supported on one side thereof and a rotatable timing element supported on the opposite side thereof, a reciprocable slider supported on said frame having a follower in engagement with said cam, a pump having a spring actuated delivery stroke, a rod for effecting the intake stroke of said pump having an interruptible driving connection with said slider, coacting means on said timing element and said pump rod for interrupting the driving connection between said slider and said pump rod, a second interruptible driving connection between said slider and said timing element, and an electromagnet which, when energized, establishes and maintains the driving connection between said slider and said timing element.

5. A windshield cleaning system comprising, a wiper unit including a motor, a washer unit including a pump having an interruptible driving connection with said motor, a wiper unit stroke counting timing element for controlling the driving connection between said pump and said motor, an electrically operated driving connection between said timing element and said motor, a manual control for simultaneously activating said wiper unit and completing an energizing circuit for the electrically operated driving connection between said timing element and said motor, and switch means actuated by said timing element for automatically interrupting said energizing circuit after a predetermined number of wiper unit strokes.

6. A windshield cleaning system comprising, a wiper unit, a washer unit including a pump having an interruptible driving connection with said wiper unit, a wiper unit stroke counting timing element for controlling the driving connection between said pump and said wiper unit, electrically operated means for establishing and maintaining a driving connection between said wiper unit and said timing element, a manual control for simultaneously activating said wiper unit and completing an energizing circuit for said electrically operated means, and switch means actuated by said timing element for automatically deenergizing said electrically operated means after a predetermined number of wiper unit strokes.

7. The windshield cleaning system set forth in claim 6 wherein said timing element comprises a ratchet cam assembly including a toothed ratchet wheel, wherein the driving connection between said motor and said timing element includes a drive pawl, and wherein the electrically operated means comprises an electromagnet which, when energized, moves said pawl into driving engagement with said ratchet wheel.

8. The windshield cleaning system set forth in claim 7 wherein said ratchet cam assembly has an upstanding lug on its face, and wherein said switch means has a follower engageable with said lug at a predetermined angular position of said ratchet cam assembly for actuating said switch means to deenergize said electromagnet.

9. A washer pump assembly for a vehicle windshield including, a frame, a rotatable cam supported on said frame, a reciprocable slider supported on said frame so as to be reciprocated during rotation thereof, a rotatable ratchet cam assembly supported on said frame, including a ratchet wheel and a cam, a pump supported on said frame having a spring actuated delivery stroke, a reciprocable pump rod for effecting the intake stroke of said pump, said pump rod having an interruptible driving connection with said reciprocable slider and being engageable with said ratchet cam to interrupt said driving connection, and an electrically operated driving connection between said slider and said ratchet wheel for imparting rotation to said ratchet cam assembly to control the operation of said pump.

10. A washer pump assembly for a vehicle windshield including, a frame, a rotatable cam supported on said frame, a reciprocable slider supported on said frame so as to be reciprocated during rotation thereof, a rotatable ratchet cam assembly supported on said frame including a ratchet wheel and a cam, a pump supported on said frame having a spring actuated delivery stroke, a reciprocable pump rod having an interruptible driving connection with said reciprocable slider and being engageable with said ratchet cam to interrupt said driving connection, a drive pawl for said ratchet wheel pivotally connected to said slider, spring means engaging said pawl and normally maintaining said pawl disengaged from said ratchet wheel, and an electromagnet which, when energized, moves said pawl into driving engagement with said ratchet wheel.

11. The washer pump assembly set forth in claim 10 wherein said ratchet cam assembly includes a face lug, and switch means for controlling the energization of said electromagnet including a switch blade extending transversely across said ratchet cam assembly and having a follower engageable with said lug to open said switch means at a predetermined angular position of said ratchet cam assembly.

12. In a windshield washer pump of the type having a spring actuated delivery stroke, a reciprocable pump rod effecting the intake stroke, a wiper motor having an interruptible driving connection with said pump rod and a ratchet cam assembly for controlling the driving connection between said pump rod and said motor, the improvement which comprises a drive pawl continuously reciprocated by said motor, spring means normally maintaining said drive pawl disengaged from said ratchet cam assembly, and an electromagnet which, when energized, attracts said pawl and moves it into driving engagement with said ratchet cam assembly.

13. The combination set forth in claim 12 including an energizing circuit for said electromagnet comprising a manually operable switch and an automatic switch connected in shunt relation therewith, said automatic switch including a switch blade having a follower, said ratchet cam assembly including a face lug engageable with said follower at a predetermined angular position of said ratchet cam assembly for opening said automatic switch after a predetermined angular movement of said ratchet cam assembly.

References Cited in the file of this patent
UNITED STATES PATENTS
2,905,962    Ziegler _____ Sept. 29, 1959